July 24, 1934.  R. C. RUSSELL  1,967,563
CLUTCH
Filed Aug. 21, 1933  2 Sheets-Sheet 2
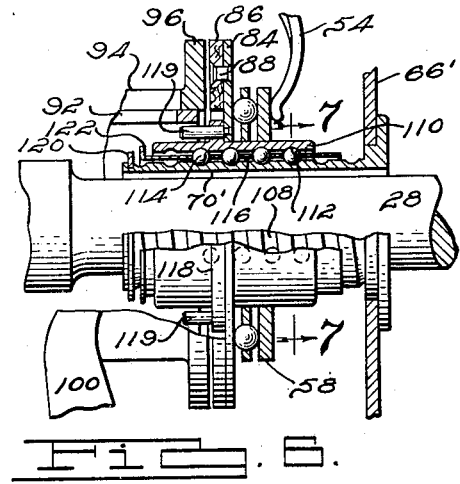
FIG. 6.
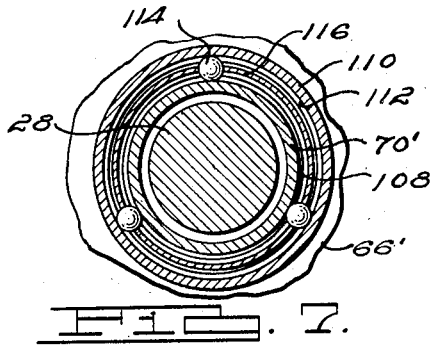
FIG. 7.
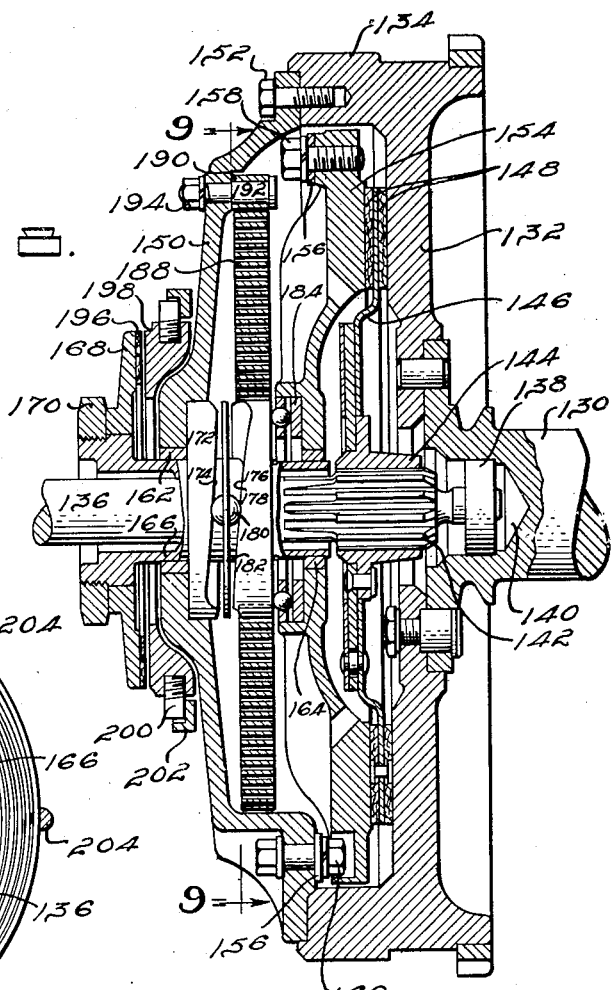
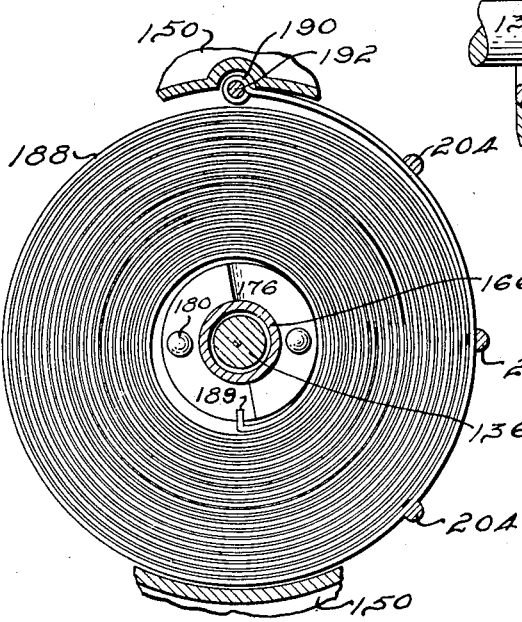
FIG. 8.
INVENTOR.
Robert C. Russell.
BY
Harness, Dickey, Pierce & Hann.
ATTORNEYS.

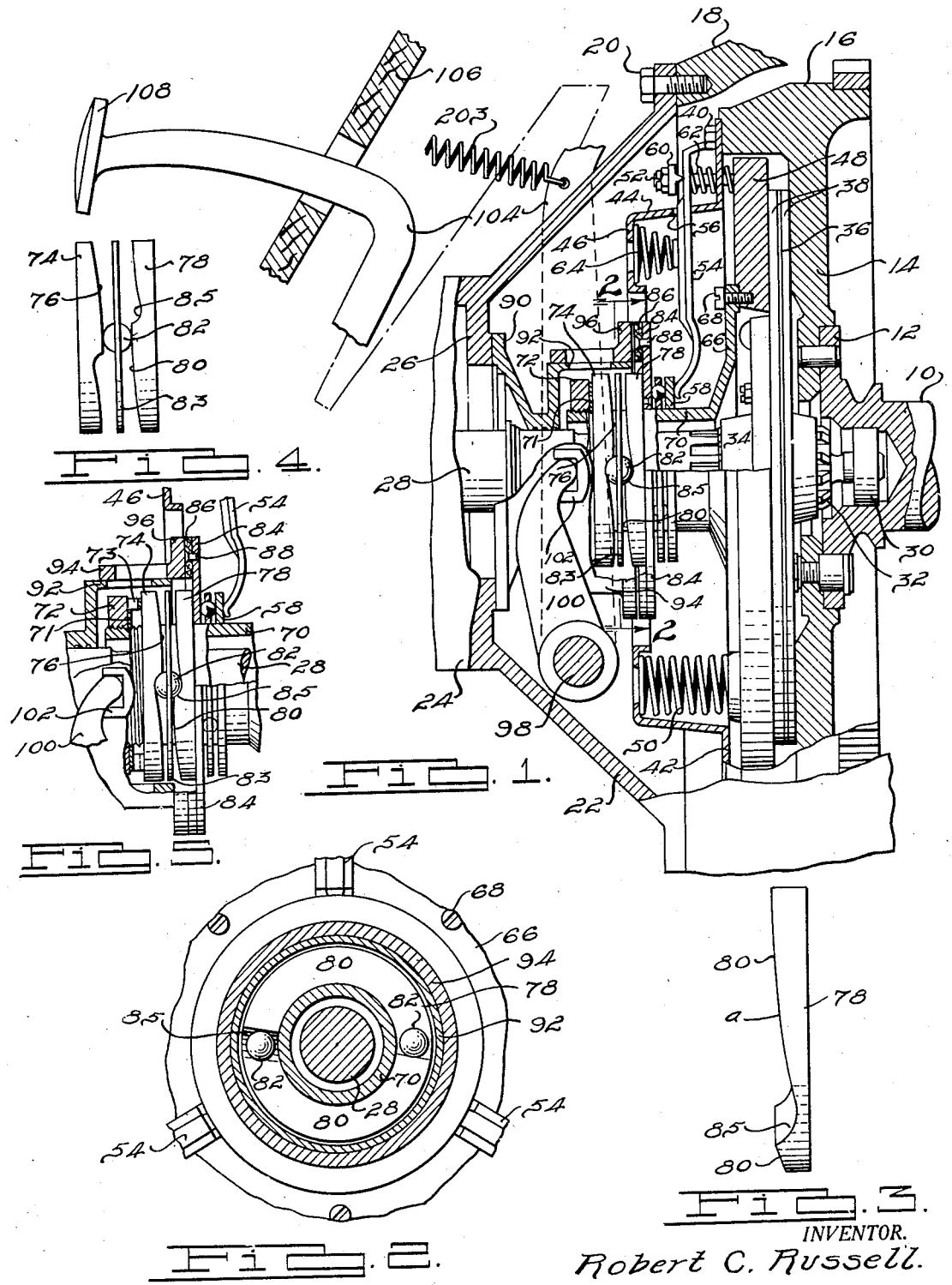

Patented July 24, 1934

1,967,563

UNITED STATES PATENT OFFICE 1,967,563

CLUTCH

Robert C. Russell, Detroit, Mich.

Application August 21, 1933, Serial No. 686,019

13 Claims. (Cl. 192—36)

This invention relates to clutches and particularly to clutches of the plate type, the principal object being the provision of a clutch which may be operated with a minimum expenditure of energy on the part of the operator.

Other objects include the provision of a servo mechanism for effecting disengagement of a clutch; the provision of a clutch in which power derived from the driving member may be employed for moving the clutch to released position; the provision of a clutch having spring means normally urging it toward engaged position and friction means under the control of the operator of the clutch enabling the operator to tap the power in the driving member and apply it to the operation of moving the clutch to released position; and the provision of a clutch having a servo mechanism associated therewith so constructed and arranged that the operation of the clutch either to or from engaged position is at all times under absolute control of the operator whether the driven member is rotating or not, including a pilot or auxiliary friction device both members of which are bodily movable and one of which is under the control of the operator.

Other objects include the provision of a clutch having a pair of members normally rotatable with the driving member thereof, one of said pair of members being so related with respect to the other thereof that relative rotation between them causes axial movement of one relative to the other, and manually controllable friction means associated and bodily movable with the axially movable one of said pair of members whereby the rotation thereof relative to the other may be retarded in a controlled manner thereby to cause desired movement of the clutch through relative axial movement between said pair of members; the provision of a plate clutch having a member fixed for equal rotation with the driving element of the clutch and a second member normally rotatable with but also rotatable relative to the first member, anti-friction means being interposed between said members and the members being so formed that upon relative rotation between them axial movement is imparted to one of them, and manually controllable means frictionally associated with one of said members whereby to enable retardation of its rotation relative to the other and through relative axial movement between the members cause disengagement of the clutch.

Other objects include the provision of a plate type of clutch having a novel form of servo mechanism to effect disengagement thereof and including a pair of associated rings, one of which is fixed for equal rotation with the driving member of the clutch, and the rings being provided with complementary inclined surfaces at their adjacent ends, anti-friction means being provided between the complementary inclined surfaces and means being provided for effecting relative rotation between the rings whereby to cause axial displacement of one with respect to the other; the provision of a mechanism as above described in which the inclined teeth are so shaped as to cooperate with the antifriction means to limit a relative rotation between the rings; the provision of a mechanism as above described in which the inclined surfaces are in the form of threads; and the provision of a mechanism of the type described in which a novel means is provided for maintaining the relative position of the balls with respect to each other and to the rings.

Other objects include the provision of a novel servo mechanism for clutches including a pair of relatively rotatable members having complementary inclined teeth, the teeth being inclined at varying degrees between their end surfaces whereby to enable the desired degree of axial movement to be obtained between them while permitting them to be maintained in axially displaced relation with a minimum of effort.

Other objects include the provision of a novel servo mechanism for operating a clutch so designed as to permit actuation of the clutch manually without the aid of the servo mechanism.

Further objects include the provision of a plate type of clutch having spring means for indirectly clamping the clutch elements together including co-acting cam elements constantly urged toward one direction of rotation with respect to each other, and means frictionally associated with one of the cam elements capable of being actuated to cause relative rotation between the members in a direction opposite to that in which they are normally urged, thereby to effect release of the clutch.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views, Fig. 1 is a partially broken, partially sectioned view of a clutch taken in a vertical plane including the axis thereof, the clutch being shown in engaged position.

Fig. 2 is a fragmentary vertical, transverse sectional view taken on the line 2—2 of Fig. 1.

Fig. 3 is an enlarged end view of one of the cam rings.

Fig. 4 is a side elevational view of the cam rings and cooperating ball members in a position in which the rings are separated a maximum amount.

Fig. 5 is a fragmentary, partially sectioned, side elevational view of the servo mechanism for the clutch shown in Fig. 1 illustrating the position of the parts thereof when the clutch is disengaged solely by manual pressure.

Fig. 6 is a fragmentary, partially broken, vertical sectional view taken axially through a modified form of servo mechanism for the clutch shown in the previous views.

Fig. 7 is a transverse vertical sectional view taken on the line 7—7 of Fig. 6.

Fig. 8 is a vertical sectional view taken longitudinally through a modified form of clutch construction.

Fig. 9 is a vertical, transverse sectional view taken on the line 9—9 of Fig. 8.

While the present invention is applicable to clutches regardless of their use, as will be readily understood by those skilled in the art, it is particularly adaptable for use in connection with motor vehicles and for that reason and for the purpose of illustrating one suitable use only its application to motor vehicles will be referred to herein.

As is well understood by those skilled in the motor vehicle art, the present trend of design is toward more powerful engines, and reduced overall height of the vehicle which means decreased ground clearance. The increased power of the vehicle demands a clutch capable of handling an increased load and the reduced ground clearance demands a clutch of minimum diameter which in turn requires higher clutch pressures. Where such a clutch is released purely through manual pressure as in the majority of conventional constructions, and due to the limited amount of permissible pedal travel for the clutch operating lever, it is obvious that the pedal pressure required to operate the clutch becomes exceedingly large, in fact so great that in many structures now on the market it becomes exceedingly tiresome to the operator where he is required to continuously operate the clutch. At the same time, not only is it tiresome to operate clutches requiring a heavy pedal pressure but such pressure detracts from the desired accuracy of control which is necessary in most cases to obtain a smooth clutch action.

Recently attempts have been made to overcome the disadvantage of the manual operation of clutches requiring high pedal pressures by the employment of a vacuum cylinder connected with the intake manifold of the engine driving the vehicle and, while this eliminates the necessity of the vehicle operator from exertion in disengaging the clutch, the mechanism is necessarily so constructed that the operator has little, if any, actual control of the engaging movements of the clutch, which brings about an undesirable condition particularly in view of the fact that clutch engagement requirement at one speed position of the transmission is necessarily different from that at another speed position of the transmission.

In accordance with the present invention a construction is provided wherein, regardless of the actual amount of force necessary to separate the driving and driven elements of the clutch, the vehicle operator may effect either engagement or disengagement of the clutch through a foot pedal without requiring the expenditure of more than a nominal amount of energy on his part, and at the same time movements of the clutch parts at all times are absolutely under control of the driver in such a manner that the clutch may either be disengaged or engaged at any desired rate, according to his wishes. In attaining this result power to operate the clutch is derived from the driving member of the clutch which of course is directly connected to the vehicle engine, through the employment of an auxiliary or pilot clutch-like apparatus which requires a minimum amount of energy for its operation.

Referring now to the drawings, and particularly to Figs. 1 to 4 inclusive, an engine crank shaft is indicated at 10 having a flange 12 formed on its rear end which is secured to the web 14 of a flywheel having a rim 16. The clutch housing surrounding the flywheel is indicated at 18 to the rear face of which is secured as by means of cap screws 20 the bell housing portion 22 of a transmission casing 24. Rotatably mounted in the front wall 26 of the transmission casing 24 is a shaft 28 which projects forwardly therefrom and its forwardly reduced end is rotatably supported by a bearing 30 mounted within the rear end of the crank shaft 10 in a conventional manner. Immediately rearwardly of the flange 12 of the crank shaft 10 the shaft 28 is splined as at 32 and slidably but non-rotatably received thereon is the hub 34 of a clutch driven member 36 provided on opposite faces with a suitable friction material 38 in accordance with conventional practice. Secured to the rear face of the rim 16 of the flywheel as by cap screws 40 is a clutch cover 42, shown as being formed from sheet metal, and extending first radially inwardly of the rim 16 of the flywheel, then approximately axially in a rearward direction as at 44, and then again radially inwardly as at 46. A pressure plate 48 of ring-like formation is located between the cover 42 and the clutch driven element 36 and a plurality of coil springs 50 constantly maintained under compression between the wall 46 of the clutch cover 42 and the pressure plate 48 constantly urge the pressure plate 48 toward the web 14 of the flywheel so as to clamp the driven disc 36 therebetween for equal rotation therewith. Suitable means, not shown, connect the pressure plate 48 to the flywheel for equal rotation therewith but permit relative axial movement between them in accordance with conventional practice.

A plurality of axially parallel rearwardly projecting studs 52 are threaded into the pressure plate 48 adjacent the outer edge thereof and project through the radially extending outer portion of the clutch cover 42. A radially extending clutch finger 54 is slidably received adjacent its outer end upon each of the studs 42 and projects radially inwardly therefrom through an opening 56 in the portion 44 of the clutch cover 42 and into a position where its inner end may be readily engaged by the clutch throwout or thrust bearing 58. An abutment for each of the fingers 54 is provided on the corresponding stud 52 in the form of an adjustable nut 60, and a coil spring 62 surrounding each stud 52 is maintained under compression between the corresponding finger 54 and the pressure plate 48 to maintain the finger against the abutment and to aid in preventing rattling thereof. Another relatively light coil spring 64 is provided between each finger 54 and the rear wall 46 of the clutch cover 42 to further aid in preventing rattling of the fingers 54 during operation of the clutch.

The construction thus far described is entirely conventional and as far as the present invention is concerned, any other similar conventional construction may be employed in its place.

In accordance with the present invention a member 66 is fixed to the pressure plate 48 as by means of screws 68 and is provided with a rearwardly extending sleeve 70 concentric with the shaft 28 and preferably radially spaced therefrom as indicated. The bearing 58 is shown in the present case as being rotatably and slidably mounted upon this sleeve 70. Relatively non-rotatably but axially slidably mounted on and adjacent the rear end of the sleeve 70 and maintained against rearward movement thereon by means of a nut 72 which may also be employed for compensating for wear of the clutch facings 38, is a member 74 in the form of a ring, the axially forward face of which is provided with a plurality of equally angularly arranged axially inclined surfaces or teeth 76, two of such teeth being shown as preferably, although more may be used in some cases. Another ring member 78 is rotatably and axially slidably mounted on the sleeve 70 forwardly of the ring 74 and its rear axial face is provided with two equally angularly spaced inclined surfaces or teeth 80 complementary in inclination and angular extent to the teeth 76. Suitable anti-friction means, illustrated as a plurality of bearing balls 82, are interposed between opposed teeth 76 and 80 and are maintained in equally angularly spaced relation about the axis of the shaft 28 by a retainer 83 of plate-like form. Assuming that the clutch turns in the conventional direction, that is, in a clockwise direction as viewed from the right hand end of Fig. 1, then the teeth 76 and 80 are inclined in a direction corresponding to that of a right hand thread, and where the bottom of one tooth joins the top of the adjacent tooth the rings 74 and 78 are radiused as at 85 an amount corresponding to the curvature of the balls 82 so as to form a reverse movement stop therefor as will hereinafter be more fully brought out.

To the forward face of the member 78 is fixed a disc 84, bodily movable therewith, in the present case shown as an integral part of the rear element of the thrust bearing 58, having a ring 86 of friction material secured to its rear face as by means of rivets 88.

A member 90 suitably fixed to the forward face of the transmission front wall 26 is provided with a forwardly projecting sleeve portion 92 concentric with the axis of the shaft 28 and upon which is slidably received a sleeve 94 provided at its forward end with a radially outwardly extending flange 96, the forward face of which is formed and adapted for engagement with the friction ring 86. Suitably supported within the bell housing 22 is the usual clutch shaft 98 provided with the usual yoke 100 the free ends of which engage in diametrically opposite pockets 102 formed on the sleeve 94. Exteriorly of the bell housing 22 a clutch pedal 104 of conventional construction is secured to the shaft 98.

Assuming that various parts of the clutch are in the position indicated in Fig. 1, it will be apparent that the clutch is engaged so that any power being exerted by the crank shaft 10 will be directly transmitted through the shaft 28. Assuming now that the clutch is turning in the direction previously noted and the parts are in the position indicated in Fig. 1, the flywheel, pressure plate 48 and driven disc 36 will all rotate in the same direction at equal velocities and, because the ring member 74 is fixed for equal rotation with the pressure plate 48, it will also turn therewith. Although the ring member 78 is free to rotate relative to the axis of the sleeve 70, the ends of the fingers 54 in pressing rearwardly against the thrust bearing 58 will urge the ring member 78 rearwardly and tend to rotate the member 78 in a direction so as to reduce the combined axial dimensions of the rings 74 and 78 to a minimum as indicated in Fig. 1 and, accordingly, the ring 78 will also tend to rotate with the ring 74 and the remaining parts of the clutch.

If now it is desired to disengage the clutch the upper end of the clutch pedal 104 is pressed forwardly causing the shaft 98 to be rocked in a clockwise direction as viewed in Fig. 1 and causing the free ends of the yoke 100 to urge the sleeve 94 forwardly and bring the forward face of its flange 96 into contact with the friction ring 86 secured to the disc 84. When this occurs the friction set up between the flange 96 and the ring 86 will tend to retard the rotation of the disc 84 and consequently the ring 78 relative to the ring 74, and when such retardation occurs the balls 82 will roll toward the respective points of the cooperating teeth 76 and 80 and thus force the ring members 74 and 78 axially away from each other towards the position indicated in Fig. 4. The ring 74 being maintained against axial rearward displacement, the ring 78 will move forwardly with the thrust bearing 58 and cause the latter to press against the inner ends of the clutch fingers 54 and cause such fingers 54 to pivot about the forward edge of their respective openings 56 in the clutch cover 42, and this movement of the fingers 54 acting through the nuts 60 and studs 52 will tend to cause the pressure plate 48 to be withdrawn rearwardly against the force of the springs 50 so as to free the clutch driven disc 36 between it and the web 14 of the flywheel, thus disengaging the clutch.

Obviously, if the pedal 104 is depressed only far enough to permit an initial engagement of the flange 96 of the sleeve 94 with the friction ring 86 on the disc 84, and then is held in such position, only initial rotational movement of the ring 78 relative to the ring 74 will occur for, as soon as such partial rotation of the ring 78 occurs, it will draw away from the flange 96 so as to relieve the friction between it and the flange 96, and as soon as such friction is relieved sufficiently to permit equal rotation of the rings 74 and 78, no further relative rotation of the ring 78 will occur. This partial relative rotation of the ring 78 may not be sufficient to cause release of the clutch, but if further releasing movement of the clutch is desired all that is necessary is to press the clutch pedal 104 a further amount to again set up sufficient friction between the flange 96 and friction disc 86 to cause a further relative rotation between the rings 74 and 78. Obviously, if the pedal 104 is depressed and continued pressure is applied thereto so as to cause the flange 96 to follow up forward movement of the friction ring 86 in moving forward with the ring 78, continued relative rotation of the ring 78 will occur until the clutch is moved to fully disengaged position. In other words, to cause complete disengagement of the clutch the pedal 104 must be depressed sufficiently to bring the flange 96 on the sleeve 94 into contact with the friction ring 86 which is fixed to the ring 78 and the movement of the pedal 104 must continue to follow up the actual displacement of the ring 78. Conversely, when the clutch is fully released and it is desired to re-engage it, the amount of re-engagement may be easily and accurately controlled by the amount which the clutch pedal 104 is allowed to return toward normal position, and because of this fact it will be obvious that the pedal 104 may be so controlled by the operator that any amount or degree of slippage of the clutch may be caused to occur during engagement thereof, thus permitting the desired smooth acceleration of the vehicle in which the clutch is mounted, through proper controlled slippage of the clutch.

It may be noted that sufficient relative rotation of the ring 78 to permit the balls to roll over the high ends of the teeth 76 and 80 may be prevented in any suitable manner, for instance, as by providing a stop for the pedal 104 to prevent it from being moved through a distance which would be sufficient to cause the balls 82 to roll over the ends of the teeth. Such a stop may take the form of adjustable means supported either by the clutch housing 18 or bell housing 22 but, for the purpose of simplicity, it may be considered that the floor board 106 contacting with the pedal pad 108 of the pedal 104 will serve the desired purpose and thus will limit the movement of the ring 78 so as to prevent the balls 82 from rolling beyond the position indicated in Fig. 4. The rings 74 and 78 are, of course, limited in their relative rotation in the opposite direction by the balls 82 seating in the radiused surfaces 85 of the opposed members. It may also be noted that when the pedal pad 108 contacts with the floor board 106 so as to move the rings 74 and 78 to the relative positions indicated in Fig. 4, the flange 96 and friction ring 86 will simply slip relative to one another without causing any added relative rotation of the ring 78 when the clutch is in fully disengaged position.

The amount of pressure which it is necessary to apply manually to the pedal 104 to retard the rotation of the ring 78 and to move the clutch to disengaged position, will vary in accordance with the diameter of the disc 84 and the inclination of the teeth 80. The diameter of the disc 84, for the purpose of compactness in arrangement of the clutch, is preferably kept at a minimum, and it will be recognized that the inclination of the teeth 76 and 80 must be such as to insure a complete disengagement of the clutch and at the same time be sufficient to take care of normal wear of the clutch facing 38.

With the construction of the rings 74 and 78 shown it will be noted that each of the teeth 76 and 80 extends through approximately 180 degrees of angularity and that, in order to move the balls 82 from simultaneous contact with the radiused portions 85 on both rings to a position adjacent the tip of cooperating teeth 76 and 80, the ring 78 must rotate relative to the ring 74 through an angle of approximately 360 degrees. It will be recognized that if the teeth 76 and 80 contacted directly together without the interposition of rolling anti-friction means, then the maximum rotation of the ring 78 with respect to the ring 74 would be limited to the length of the teeth, that is, in the present case substantially 180 degrees, the maximum axial displacement would be limited to the height of the teeth on one ring only, and in order to get this movement the tip of one tooth would have to seat against the base of the opposed tooth when the rings were in a position of minimum combined axial length. In the present case it will be noted that the balls 82 are seated at the opposed bases of the teeth 76 and 80 when the rings are in a position of minimum combined axial length, and that when the ring 78 rotates relative to the ring 74 the balls 82 roll circumferentially of the rings at half the relative speed of their track on the ring 78. The result of this is a differential action set up between the rings 74 and 78 and the balls 82 such that the ring 78 must turn twice the length of the teeth 80 in order to make the balls 82 roll the length of the teeth 76, the balls 82 rolling along the teeth 80 at half the speed of the ring 78 and arriving at the tips of both teeth simultaneously. By this simple means it is possible to obtain an axial displacement of the rings 74 and 78 equal to twice the height of their respective teeth 76 and 80 and to travel through a distance twice the length of the teeth in being so displaced. As a result it will be apparent that the required axial displacement between the rings 74 and 78 is obtained with but half of the force which would be required to retard rotation of the ring 78 in a case where the balls 82 were omitted and the teeth allowed to slide directly on one another, this being true because the force may act through twice the distance to perform the required work. This amount of relative angular movement between the rings 74 and 78 permits the angularity of the teeth 76 and 80 to be such that a relatively small pressure between the flange 96 and friction member 86, and also on the pedal 104, is sufficient to fully disengage the clutch, and this is particularly true in a smaller type of clutch.

This light pressure on the pedal 104 will, in many cases, induce the operator of the vehicle to hold the clutch out of engagement to permit the car to coast without driving the engine, in other words, to "free wheel". It will be apparent that such practice on the part of the operator will mean that the flange 96 and ring 86 are being pressed together and continually slipping relative to each other, but that sufficient friction is being set up between them to maintain the clutch disengaged. In the lighter types of clutches this friction may not be great enough to result in undue heating of the ring 86 and flange 96 under such circumstances, but in the heavier sizes of clutches the pressure required to hold the clutch may be great enough to cause sufficient pressure on the ring 86 to burn it up. For this reason it is extremely important that the inclination of the teeth 76 and 80 be as small as possible so that the pressure required to be exerted between the flange 96 and ring 86 to hold the clutch in disengaged position will be correspondingly low as will be the friction set up between the flange 96 and ring 86. At the same time, however, the inclination of the teeth 76 and 80 must be great enough to impart sufficient axial movement to the ring 78 to cause complete disengagement of the clutch even after a normal amount of wear of the friction rings.

I have found it essential, particularly in the larger clutches, to employ not more than two teeth on each of the rings 74 and 78, thus permitting a substantially full turn of the ring 78 in moving the clutch to disengaged position. While this permits a material reduction in the inclination of the teeth 76 and 80 over anything heretofore proposed, I find it desirable to accentuate this reduction of inclination for clutch released position of the ring 78, that is, where the inclination is effective in holding the clutch fully released as in using the clutch to "free wheel", by further modifying the construction as indicated best in Fig. 3 in which it is shown applied to the ring 78 only, it being understood that the ring 74 is similarly formed.

Referring to Fig. 3 it will be noted that the inclination of each tooth 80 is relatively great adjacent the corresponding radius 85, and that the inclination of each tooth gradually decreases up to a point "$a$" substantially midway its length, and from such point "$a$" to the tip of the tooth the inclination remains substantially constant at a relatively small value. With this construction the majority or even all of the axial movement of the ring 78 may be obtained after a partial rotational movement only thereof, and after the balls 82 have reached the low inclined outer ends of the teeth the ring 78 may be maintained in this position with an exceedingly small amount of pressure exerted between the flange 96 and ring 86 with correspondingly small amount of friction between them to cause heating thereof. By this means possibility of burning up the ring 86 is effectively prevented but the pressure on the pedal 104 necessary to hold the clutch disengaged is also reduced and in some cases to such an extent that in order to obtain the proper "feel" of the clutch it is desirable to employ a spring such as 203 to constantly urge the pedal 104 toward clutch engaged position.

It will be recognized by those skilled in the art that the above details, while they may appear more or less trivial to those not skilled in the art are, in reality, features that materially aid in making the clutch a commercially practicable structure.

In exceptionally large and heavy clutches such as may be found on the larger sizes of trucks and busses, even the expedients outlined above may be found insufficient for reducing the pressure required between the flange 96 and ring 86 to continuously hold the clutch in disengaged relation without danger of undue heating of the ring 86, and in such cases it may be necessary to modify the above described construction in the manner indicated in Figs. 6 and 7.

Referring to Figs. 6 and 7 it will be noted that the member 66 in Fig. 1 has been replaced by a member 66' in the center of which is suitably fixed a rearwardly extending elongated ring member or sleeve 70' the outer surface of which is formed with a right hand thread 108 of semi-circular cross section. Surrounding the sleeve 70' is another ring member or sleeve 110, slightly shorter than the sleeve 70', and the inner surface of which is provided with threads 112 opposed to the threads 108. A plurality of bearing balls 114 are arranged between the opposed threads 108 and 112 and are maintained in their proper spaced relation by means of a retainer sleeve 116. The outer sleeve 110 is provided with a peripheral flange 118 to which the disc 84 is secured for equal rotation by means of pins 119 fixed to the disc 84 and axially slidably received in the flange 118 in the same relation to the flange 96 on the member 94 as in the previously described construction.

With this construction it will be apparent that when the pedal 104 is depressed sufficiently to bring the flange 96 into contact with the friction ring 86 the rotation of the outer sleeve 110 with the driving member of the clutch will be retarded and relative rotation will occur between the sleeve 70' and 110 which will cause the outer sleeve 110 to move to the right, as viewed in Fig. 6, and urge the clutch fingers 54 toward clutch disengaged position, and that if the forward movement of the pedal 104 is continued so as to cause the flange 96 to continue to follow the forward movement of the friction ring 86 with the outer sleeve 110, that the clutch will be completely disengaged. The functioning of the sleeve 70' and 110 with the intervening balls 114 will thus be equivalent to the construction previously described. There is this difference however, that where the previously described construction is limited to an angular displacement of the ring 78 with respect to the ring 74 of substantially 360 degrees, in the construction illustrated in Fig. 6 the sleeve 110 may move through two or more complete turns. This not only permits the pitch of the threads, which corresponds to the inclination of the teeth 76 and 80 in the previously described construction, to be materially reduced so as to lower the pressure required between the flange 96 and ring 86 to operate the clutch, but also permits a greater movement of the free ends of the clutch fingers 54 in order to move the clutch to disengaged position.

In order to insure maintenance of the balls 114 in their proper operative relationship, inner sleeve 70' is provided at its rearward end with an outwardly projecting circumferential flange 120, and the rear end of the retainer 116 is outwardly flared to provide a flange 122. The flange 120 and the rear end of the sleeve 110 thus act as stops for the flange 122, and the position of the sleeve 116 and the balls 114 embraced thereby is thereby controlled so that in all cases when the clutch is operated to cause forward movement of the outer sleeve 110, free rolling of the balls 114 in their respective grooves will be assured. This is for the reason that the balls 114, during movement of the sleeve 110 relative to the sleeve 70' will normally tend to move axially at half of the axial speed of the sleeve 110, so that when the sleeve 110 is moving forwardly away from the flange 122 there can be no possibility of anything interfering with the free rolling of the balls 114. Furthermore, when the sleeve 110 is moving forwardly, the load on the balls will force them to roll in their grooves. When the clutch is in engaged position there will be no load on the balls 114 and consequently the retainer sleeve 116 and balls 114 may become slightly displaced from the position shown due to vibrations to which the clutch is subjected or from other reasons, but the flange 122 cooperating with the flange 120 or the rear end of the sleeve 110 will limit such displacement and will effectively prevent any condition from arising in which the balls 114 must be moved in their grooves without rolling to obtain the necessary movement of the sleeve 110.

From the structures thus far described it will be apparent that as far as the operation thereof is concerned it has been considered necessary for the driving member to be rotating in order to effect operation of the clutch. Occasions may arise wherein it is desirable to be able to release the clutch when it is not rotating. This may be accomplished in the structures shown in Figs. 1 to 7 inclusive by simply pressing down the pedal 104 which, acting through the sleeve 94 and flange 96, will move the disc 84 and thrust bearing 58 forwardly against the inner ends of the clutch fingers 54 to release the clutch. In the construction shown in Figs. 6 and 7 the disc 84 in moving forwardly simply slides the pins 119 in their openings in the flange 118 without disturbing the position of the sleeve 110.

In the construction illustrated in Figs. 1 to 5 inclusive it will be apparent that the disc 84 in moving forwardly solely under the influence of axial pressure from the sleeve 94 will carry with it the forward ring 78 which is secured to the disc 84, and unless otherwise prevented the ring 78 in moving forwardly with the disc 84 would pull away from the ring 74 and leave the balls 82 free to move between them. In such case the balls 82 might become displaced circumferentially of the teeth 76 and 80 with the result that when the pedal 104 is allowed to return to normal position the balls 82 might prevent proper return movement of the ring 78 to fully retracted position, and thereby interfere with the proper engagement of the clutch. As best indicated in Fig. 5, to guard against such possibility, a spring member in the form of a ring 71 is interposed between the nut 72 and the ring 74, the ring 71 being provided with a plurality of circumferentially extending spring fingers 73 which are bent laterally out of the plane of the ring 71. These fingers exert a relatively light pressure tending to separate the nut 72 and ring 74 and normally are sprung into the plane of the ring 71 through the pressure of the clutch fingers 54 acting through the thrust bearing 58 and intervening parts, but in case where the ring 78 is moved forwardly solely by axial pressure exerted through the sleeve 94 the fingers 73 cause the ring 74 to follow the movement of the ring 78 forwardly, as indicated in Fig. 5, and thus hold the balls 82 between the rings 74 and 78 and prevent them from becoming displaced.

In Figs. 8 and 9 a modified form of structure is illustrated by means of which a result equivalent to that obtained in the foregoing construction is obtained with a considerably less number of parts. Referring to these figures it will be noted that an engine crankshaft 130 has secured to its rear end a flywheel including a web 132 and rim 134. A clutch shaft 136 has its reduced forward end suitably journaled in a bearing 138 secured in a recess 140 in the rear end of the crank shaft 130 and rearwardly thereof is splined as at 142 for non-rotatably but axially slidably receiving the hub 144 of the clutch driven disc 146 provided with friction facings 148 on its opposite faces. A clutch cover 150 is secured to the rear edge of the flywheel rim 134 by cap screws 152 and between the cover 150 and the clutch driven disc 146 is a pressure plate 154 which is maintained in concentric relation with respect to the clutch and supported therein for limited axial movement by spring straps or links 156 each of which is secured at one end to the pressure plate 154 by cap screws 158 and at their opposite ends to the clutch cover 150 by bolts 160. These straps or links 156 form the subject matter of my copending application for Letters Patent of the United States for improvements in clutches, filed August 5, 1933, Serial No. 683,719, and are fully disclosed therein. Preferably they are so tensioned as to constantly urge the pressure plate 154 towards clutch disengaged position. It is to be particularly noted that no packing springs or clutch fingers, such as the springs 50 and fingers 54 in Fig. 1 and their associated parts, are provided in this construction.

The clutch cover 150 and pressure plate 154 are provided with central bushings 162 and 164 respectively in which is axially slidably received a sleeve member 166 on the rear end of which is mounted a disc member 168 maintained against relative rearward displacement by means of a nut 170. Immediately inwardly of the clutch cover 150 there is fixed to the clutch cover 150 and relatively rotatable with respect to the sleeve 166 a ring member 172, which may be considered as identical in all respects to the ring member 74 described in connection with Fig. 1 and having inclined teeth 174 corresponding to the teeth 76 formed on its forward side. Immediately forwardly of the ring 172 a ring 176 is fixed upon the sleeve 166 and this ring may be considered identical in all respects to the ring 78 previously described and as having inclined teeth 178 corresponding to the teeth 80 on the ring 70. Balls 180 are disposed between the opposed teeth 174 and 178 and are maintained in operative position by means of a retainer ring 182. A thrust bearing 184 is provided between the central portion of the pressure plate 154 and the forward face of the ring 176. A helical spring 188 has its inner end fixed to the periphery of the ring 176 as at 189 in Fig. 8 and its outer end is formed into an eye 190 in which is received a stud 192 fixed to the clutch cover 150 by means of a nut 194. Considering the clutch to turn in the conventional direction, the turns of the spring 188 extend in a clockwise direction as viewed in Fig. 9 and as traced in a direction from the outer end of the spring toward the inner end thereof.

The disc member 168 is provided on its forward face with a ring 196 of friction material, and positioned forwardly in advance of the disc 168 and normaly out of contact with the friction ring 196 is a ring member 198 the rear face of which is formed for interengagement with the friction disc 196, and provided on diametrically opposite sides with radially projecting pins 200 adapted for engagement with the arms of a yoke 202 corresponding to the yoke arms 100 previously described in connection with Fig. 1 but adapted to be operated in a rearward direction upon depression of the usual clutch pedal corresponding to the pedal 104. In assembling this clutch the spring 188 is given an initial tension in a direction such that it constantly urges the ring 176 in a clockwise direction as viewed from the front or the right hand end as viewed in Fig. 8, and this tends to rotate the ring 176 in a clockwise direction relative to the ring 172 as viewed from the right hand end of Fig. 8 so as to cause axial displacement between the rings 172 and 176, urging the ring 176 forwardly and, acting through the thrust bearing 184, forces the pressure plate 154 forwardly so as to clamp the driven disc 146 between it and the web 132 of the flywheel. Consequently, the spring 188 in acting through the ring 176 constantly urges the clutch toward engaged position and maintains it in engaged position except when otherwise controlled. Considering the clutch to be in the position indicated in Fig. 8, it will be observed that if the ring 198 is moved rearwardly so as to cause it to engage the friction ring 196, the friction ring 196 will be retarded in its rotation and will cause a like retarding in the rotation of the ring 176. This will cause a relative rotation of the ring 176 in a counter-clockwise direction as viewed from the right hand end of Fig. 8 and will cause the balls 180 to roll toward the bottom of the teeth 174 and 178, permitting the rings 172 and 176 to approach each other in an axial direction due to the action of the spring links 156 which constantly urge the pressure plate 154 rearwardly, and thus will cause release of the clutch. By suitable manipulation of the clutch pedal the action of this clutch may be controlled in substantially identical manner as the clutch previously described may be controlled. It will be observed that in releasing this clutch the ring 198 and consequently the foot pedal controlling it will have to follow the rearward movement of the disc 168 and ring 176 to continue the releasing movement of the clutch in a manner equivalent to that of the construction previously described.

In order to guard against possible displacement of the spring 188 under the influence of the centrifugal force which the spring is subjected to during rotation of the clutch, it may be desirable to provide means in the form of abutments for the spring in order to maintain it in its proper position. Such means may take the form of stop pins 204 suitably fixed in the clutch cover 150 and positioned in approximate contact with the outer turn of the spring 188 adjacent its free end as illustrated in Fig. 9.

In both of the above described mechanisms it will be apparent that the pressure which it is necessary to manually apply to the clutch pedal in order to bring the braking surfaces of the cam rings into sufficient engagement to cause actuation of the cam rings, is relatively small and but a small percentage of the pressure which it is necessary to apply in manually controlled clutches of conventional construction, and that at the same time by the means provided it is possible to control the clutch just as precisely and accurately as such conventional clutches may be controlled by the foot in ordinary practice.

Formal changes may be made in the specific embodiments of the invention described without departing from the spirit or substance of the broad invention, the scope of which is commensurate with the appended claims.

I claim:

1. In a clutch structure, in combination, a driving element, a driven element, a pressure plate adapted to clamp said driven element to said driving element, spring means constantly urging said pressure plate toward said clamping position, a member driven directly by said driving element, a second member relatively rotatable with respect to the first mentioned member, said members being so formed and so cooperating with each other that relative rotation between them effects axial advancement of said second member relative to the first mentioned member, means operatively connecting said second member and said pressure plate for correlated movements, a part axially and rotatably movable with said second member, a second non-rotatable part movable axially of said clutch and arranged for frictional engagement with the first mentioned part, and means for controlling the axial position of said second part.

2. In a clutch structure, in combination, a driving element, a driven element, a pressure plate adapted to clamp said driven element to said driving element, spring means constantly urging said pressure plate toward said clamping position, a member driven directly by said driving element, a second member relatively rotatable with respect to the first mentioned member, said members being so formed and so cooperating with each other that relative rotation between them effects axial advancement of said second member relative to the first mentioned member, means operatively connecting said second member and said pressure plate for correlated movements, a part axially and rotatably movable with said second member, a second non-rotatable part movable axially of said clutch and arranged for frictional engagement with the first mentioned part, and means for moving said second part into contact with the first mentioned part whereby to retard the rotation of said second member relative to the first mentioned member and effect an axial displacement of said pressure plate, said means being operable to move said second part axially with the first mentioned part as said second member advances to release said pressure plate whereby to prevent frictional disengagement of said parts due to the advancement of said second member.

3. In a clutch structure, in combination, a driving element, a driven element, a pressure plate adapted to clamp said driven element to said driving element, spring means constantly urging said pressure plate toward said clamping position, a member rotatable with said driving element, a second member relatively rotatable with respect to the first mentioned member, said members being so formed and so cooperating with each other that relative rotation between them effects axial advancement of said second member relative to the first mentioned member, means operatively connecting said second member and said pressure plate for correlated movements, a part fixed for equal rotation with said second member but axially movable relative to or simultaneously therewith, a second non-rotatable part movable axially of said clutch and arranged for frictional engagement with the first mentioned part, and means for controlling the axial position of said second part.

4. In a clutch structure, in combination, a driving element, a driven element, a pressure plate, spring means constantly urging said pressure plate toward a position to clamp said driven element to said driving element, means for retracting said pressure plate against the force of said spring means including a pair of telescoping sleeves one of which is constantly rotatable with said driving element and the other of which is both rotatable and axially movable with respect to the first mentioned sleeve, said sleeves having opposed thread-like grooves formed in their opposed faces, anti-friction means received in said opposed grooves, means for effecting a relative rotation of said other of said sleeves during rotation of said driving element, and means operatively connecting said other of said sleeves with said pressure plate.

5. In a clutch structure, in combination, a driving element, a driven element, a pressure plate, spring means constantly urging said pressure plate toward a position to clamp said driven element to said driving element, means for retracting said pressure plate against the force of said spring means including a pair of telescoping sleeves one of which is driven directly by said driving element and the other of which is both rotatable and axially movable with respect to the first mentioned sleeve, said sleeves having opposed thread-like grooves formed in their opposed faces, balls received in said opposed grooves, a retainer sleeve between said sleeves embracing said balls and maintaining them in predetermined relation with respect to each other, means operatively connecting said other of said sleeves with said pressure plate, and means for effecting rotation of said other of said sleeves relative to the first mentioned sleeve during rotation of said driving element.

6. In a clutch structure, in combination, a driving element, a driven element, a pressure plate, spring means constantly urging said pressure plate toward a position to clamp said driven element to said driving element, means for retracting said pressure plate against the force of said spring means including a pair of telescoping sleeves one of which is rotatable with said driving element and the other of which is both rotatable and axially movable with respect to the first mentioned sleeve, said sleeves having opposed thread-like grooves formed in their opposed faces, balls received in said opposed grooves, a retainer sleeve between said sleeves embracing said balls and maintaining them in predetermined relation with respect to each other, a stop surface on the first mentioned sleeve, a stop surface on said other of said sleeves, a flange on said retainer sleeve engageable with said stop surfaces to limit the position of said retainer sleeve and said balls with respect to the two first mentioned sleeves, means operatively connecting said other of said sleeves with said pressure plate, and means for effecting rotation of said other of said sleeves relative to the first mentioned sleeve during rotation of said driving element.

7. In a clutch structure, in combination, a driving element, a driven element, a pressure plate, spring means constantly urging said pressure plate toward a position to clamp said driven element to said driving element, means for retracting said pressure plate against the force of said spring means including a pair of sleeve members one within the other and one rotatable with said driving member, opposed thread-like grooves formed in the opposed surfaces of said members, balls received in said grooves for connecting said members together, a friction member non-rotatable relative to said other member but axially slidable thereon, an abutment on said other member limiting axial movement of said friction member in one direction relative thereto, means operatively connecting said friction member and said pressure plate for interrelated movement, and a manually controllable friction member engageable with the first mentioned friction member.

8. In a clutch structure, in combination, a driving element, a driven element, means for connecting said elements together in driving engagement, and means for variably controlling the establishment of driving engagement between said elements, comprising a member constantly driven by the driving element, a second member movable for variably controlling said driving engagement in proportion to its movement, means constructed and arranged to be actuated by the constantly driven member to effect movement of the second member, and movable means for controlling the operation of the last-mentioned means to cause the second member to move in follow-up relation to movements of the movable means.

9. In a clutch, in combination, a driving and a driven shaft arranged in end to end relation, friction means secured respectively to said shafts and relatively movable for establishing variable driving connection between said shafts, means constantly urging said friction means toward full shaft connected positions, control means movable in opposite directions between two controlling positions, power operated means mechanically interconnected between said control means and said friction means constantly driven by said driving shaft and constructed and arranged to effect relative movement between said friction means toward full shaft connected and disconnected positions in follow-up relation with movement of said control means between its two positions.

10. In a clutch structure, in combination, a driving element, a driven element, means for securing said driving element and said driven element together in driving engagement, and means for relieving said driving engagement including a member constantly driven by said driving element, a member drivable by said constantly driven member to relieve said securing means, and means movable in follow-up relation to the relieving movements of the drivable member for controlling said relieving movements.

11. In a clutch structure, in combination, a driving element, a driven element, means for securing said driving element and said driven element together in driving engagement, and means for relieving said driving engagement including a member constantly driven by said driving element, a member bodily shiftable by said constantly driven member to relieve said securing means, and means movable in follow-up relation to the relieving movements of said bodily shiftable member cooperable with said bodily shiftable member independently of said constantly driven member for controlling said relieving movements.

12. In combination, a driving element, a driven element frictionally engageable therewith, means for moving one of said elements bodily relative to the other thereof to control said frictional engagement including a pair of relatively rotatable members one of which is driven by said driving element and the other of which is cooperatively associated with said driven element, said members being so formed and so cooperating with each other that relative rotation between them effects axial movement of one with respect to the other, a part rotatable with said other member but axially movable relative thereto, a second part movable axially of said driving element and restrained against rotation therewith arranged for frictional engagement with the first mentioned part, and means for controlling the axial position of said second part.

13. In combination, a driving element, a driven element frictionally associated therewith, means for moving one of said elements bodily with respect to the other thereof to control said frictional engagement including a pair of relatively rotatable sleeves one within the other and one of which is cooperatively associated with one of said elements and the other of which is cooperatively associated with the other of said elements, said sleeves having opposed thread-like grooves formed in their opposed faces, balls received in said opposed grooves, a retainer sleeve between said sleeves embracing said balls and maintaining them in predetermined relation with respect to each other, and means for effecting relative rotation between said pair of sleeves.

ROBERT C. RUSSELL.